(12) United States Patent
Takaishi

(10) Patent No.: US 6,728,061 B2
(45) Date of Patent: Apr. 27, 2004

(54) HEAD POSITION CONTROL METHOD, CONTROL DEVICE FOR DISK DEVICE AND DISK DEVICE

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 379 days.

(21) Appl. No.: 09/727,902

(22) Filed: Dec. 1, 2000

(65) Prior Publication Data
US 2001/0030828 A1 Oct. 18, 2001

(30) Foreign Application Priority Data
Mar. 30, 2000 (JP) ....................................... 2000-093097

(51) Int. Cl.$^7$ .............................................. G11B 5/596
(52) U.S. Cl. ................ 360/78.07; 360/77.08; 360/77.04; 360/78.09; 360/78.14
(58) Field of Search ................ 360/75, 77.04, 360/77.02, 78.04, 78.09, 78.11, 78.14, 77.08, 78.06, 78.07

(56) References Cited

U.S. PATENT DOCUMENTS 5,617,388 A * 4/1997 Ishioka et al. ........... 369/44.28
6,130,797 A * 10/2000 Akagi et al. ............. 360/77.04
6,166,875 A * 12/2000 Ueno et al. .............. 360/77.04
6,493,173 B1 * 12/2002 Kim et al. ................ 360/77.04

FOREIGN PATENT DOCUMENTS

| JP | 3-62371 A | | 3/1991 |
| JP | 06176513 A | | 6/1994 |
| JP | 07-50075 | * | 2/1995 |
| JP | 09035225 A | | 2/1997 |
| JP | 10021662 A | | 1/1998 |
| JP | 411053828 A | * | 2/1999 |
| JP | 11120720 A | | 4/1999 |

* cited by examiner

Primary Examiner—Andrew L. Sniezek
(74) Attorney, Agent, or Firm—Greer, Burns & Crain, Ltd.

(57) ABSTRACT

The present invention relates to a head positioning method and device for positioning a head to read information from disk media at prescribed positions using a rotary actuator, in which eccentricity errors of the rotary actuator are corrected. In a disk device having disk media, a head, a rotary actuator, and a control circuit, memory is provided to store eccentricity correction information for each region of a disk divided in the radial direction. Eccentricity correction information corresponding to the head position is read, and eccentricity correction signals are created. Optimal eccentricity correction corresponding to the position of the head on the disk is made possible, and rapid seeking is enabled.

14 Claims, 14 Drawing Sheets

| Address | Data |
|---|---|
| 0 | Head 0, Zone 1, Z1 |
| 1 | Head 0, Zone 1, Z2 |
| 2 | Head 0, Zone 2, Z1 |
| 3 | Head 0, Zone 2, Z2 |
| ... | ... |
| 2*k | Head 0, Zone k, Z1 |
| 2*k+1 | Head 0, Zone k, Z2 |
| ... | ... |
| 2*N+1 | Head 0, Zone N, Z2 |
| 2*N+2 | Head 1, Zone 1, Z1 |
| ... | ... |

11-1

HEAD POSITION CONTROL METHOD, CONTROL DEVICE FOR DISK DEVICE AND DISK DEVICE

BACKGROUND OF THE INVENTION

1. Field of the Invention

This invention relates to a control method and control device for controlling an actuator to cause a head to track a disk in eccentric rotation in a disk device for reading data from, or for reading from and writing to, disk storage media by means of a head.

2. Description of the Related Art

Disk storage devices, such as magnetic disk devices and optical disk devices, are widely used as storage devices for computers and other systems. In such disk storage devices, eccentricity of the disk media occurs. This eccentricity arises because the center of rotation of the disk media on which positional information is stored is shifted from the center at the time positional information is recorded.

In a sector servo design, positional information (servo information) used to determine the position of an actuator is recorded in each sector of the tracks of the disk surface. If the rotational center of the disk coincides with the rotational center when positional information is recorded, then ideally, no eccentricity occurs.

However, in reality, the centers of rotation do not coincide, and eccentricity occurs. Possible causes of this include the use of disk media with servo information written by a different device, thermal deformation of the disk media and spindle axis, and shifts in the disk media due to shocks from outside. When such eccentricity exists, it appears to the actuator that sinusoidal disturbances at an integral multiple of the rotation frequency are added. Hence engineering is necessary to correct this eccentricity.

In servo control, control amounts are calculated from position errors. Hence in principle, servo control can be used to follow the disk eccentricity. However, when the amount of eccentricity is large, time is required to follow the eccentricity using servo control alone. Hence the amount of disk eccentricity correction is measured in advance and stored. The stored eccentricity correction amount is provided to the actuator, in addition to the control amounts of the servo control system, as a feed-forward current, to correct for eccentricity.

For example, methods of magnetic head position control using an eccentricity estimation observer have been disclosed in detail in Japanese Patent Laid-open No. 7-50075 (U.S. Pat. No. 5,404,235) and in Japanese Patent Application 10-185046.

The observer comprises an eccentricity estimation observer, comprising an actuator model and an eccentricity model; the subsequent state is predicted from the error between the detected position and the estimated position, from the control current, and from state variables, and moreover a control current is created from the predicted state. In this way, eccentricity is corrected for in realtime, so that prompt compensation for eccentricity is possible. In such eccentricity correction methods, it has been proposed that different eccentricity correction parameters be used for each disk surface; a single eccentricity correction parameter is stored for each disk surface, and this is read, and eccentricity correction amounts are calculated according to the state. That is, a common eccentricity correction parameter is used for a single magnetic disk surface, and the eccentricity correction amount for each track of the magnetic disk surface is calculated.

However, using the prior art, there are a number of problems.

First, when using a rotary actuator, the trajectory described by the head is arc-shaped, and does not coincide with the disk radial direction. Hence the influence of the disk deviation is different when the head is at inner circumferences on the disk and when it is at outer circumferences. Consequently, the optimal eccentricity correction amount differs for inner and outer circumferences on the disk.

Conventionally, in order to compensate a common eccentricity correction amount for such different eccentricity correction amounts, the zero-cross point of the open-loop characteristics of the feedback system is raised, for rapid convergence on the optimum eccentricity correction amount at the track position. However, in sampling servo control the sampling servo frequency must be raised in order to raise the zero-cross point. In order to raise the sampling servo frequency, the number of servo signals per track must be increased, and so there is the problem that the storage capacity of one track is reduced.

Second, when a disk written with position signals by an external servo track writer is stalled into a disk device, and in disk devices the disk media of which can be exchanged, the distance from the center of the actuator of the device used to write position information to the disk to the center of the head read/write core, and these distances in the device using the disk, are different. That is, track widths are 1 $\mu$m or less, and it is difficult to improve the precision of device assembly to correspond to this. Consequently the number of tracks for eccentricity correction is increased, and time is required to follow disk eccentricity when the amount of eccentricity correction is common among disk surfaces, and so there is the problem that seek times cannot be shortened.

SUMMARY OF THE INVENTION

An object of this invention is to provide a head position control method, control device for disk device and disk device to obtain the optimum eccentricity correction amount at each track on a disk surface.

Another object of this invention is to provide a head position control method, control device for disk device and disk device to optimize the amount of eccentricity correction at each track on a disk surface, without increasing the sampling frequency.

Still another object of this invention is to provide a head position control method, control device for disk device and disk device to obtain the optimum eccentricity correction amount at each track on a disk surface, even when the eccentricity is large.

In order to perform this object, the head position control method for disk device of this invention comprises a step of reading sector position information of the disk with a head; a step of detecting the current position of the head by demodulating the position information; and, a step of calculating, a control amount corresponding to the position error between the target position and the current position, and the eccentricity correction amount for the disk, and calculating an actuator control amount for a rotary actuator for moving the head from the control amount and the eccentricity correction amount. In the above-mentioned calculation step, the eccentricity correction amount is calculated by reading the eccentricity correction information corresponding to the head position from stored eccentricity correction information for each of a plurality of regions divided in the radial direction on the disk, corresponding to the head position.

The head position control device of this invention has a head for at least reading information on a disk storage media; a rotary actuator for moving the head; a control circuit for calculating a control amount of the rotary actuator, based on position signals read from the disk storage media by the head; and memory for storing eccentricity correction information for each of a plurality of regions divided in the radial direction of the disk. The control circuit reads eccentricity correction information corresponding to the head position from the memory, and calculates the eccentricity correction amount.

In this invention, when a rotary actuator is used, there is a large difference between eccentricity amounts at the inner and outer circumferences of the disk, and so by dividing the disk into a plurality of regions, and setting eccentricity correction information for each region, optimal eccentricity correction can be performed according to the head position. Consequently optimal eccentricity correction becomes possible for each track, without raising the sampling frequency. By this means it is possible to have a sector servo correct for eccentricity without reducing the storage capacity.

The head position control method further comprises a step for saving the eccentricity correction amount for the current position at the start of seek operation, and a step for reading the eccentricity correction information for the region of the target position of the seek operation. And the calculation step comprises a step for calculation of the eccentricity correction amount according to the eccentricity correction information which has been read. Before the start of a seek operation, the eccentricity correction information is changed, so that there is no need to change the eccentricity correction information during seek control. Consequently there is no increase in the operations performed in seek control, and so optimal eccentricity correction is possible while maintaining fast seek control.

In the head position control method for disk device, the saving step comprises a step of converting the eccentricity correction amount for the current position into eccentricity correction information for the reference sector of the track of the current position, and a step of storing the converted eccentricity correction information. And the readout step has a step of converting the eccentricity correction information which has been read into eccentricity correction information for the sector of the target position. Because eccentricity correction information is stored for the reference sector, eccentricity correction information is easily calculated for each sector, and only a small amount of eccentricity correction information need be stored.

In the head position control method for disk devices, the calculation step comprises a step of calculating the control amount using an observer to estimate the position, velocity, and eccentricity correction amount of the head, in accordance with the position error. Because an observer is used, high-speed following of the eccentric track is possible even when using small amounts of eccentricity correction information.

DESCRIPTION OF THE PREFERRED EMBODIMENTS

Here embodiments of this invention is explained, in the order disk device, positioning control system, and other embodiments and aspects of embodiments.
[Disk Device]

Figure 1:
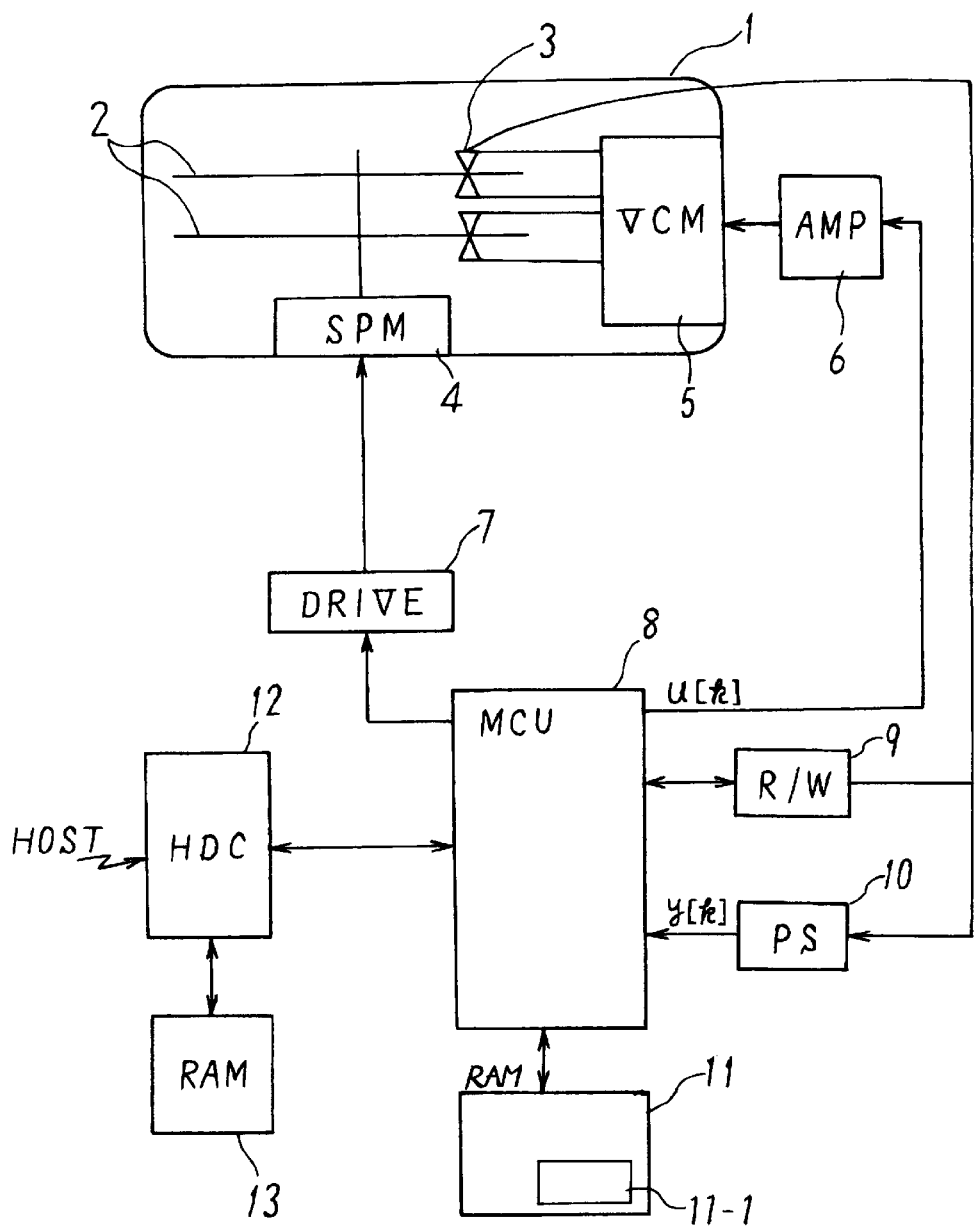
FIG. 1 is a drawing showing the configuration of the disk device of one aspect of an embodiment of this invention.
Figure 2:
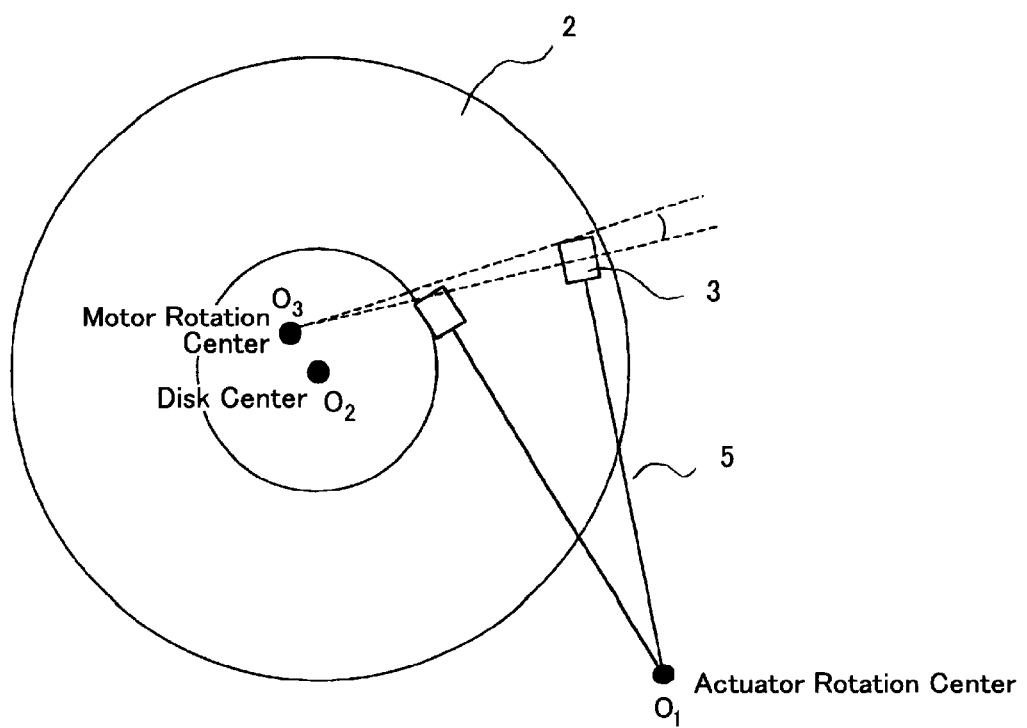
FIG. 2 is a drawing used to explain the rotary actuator of FIG. 1.
Figure 3:
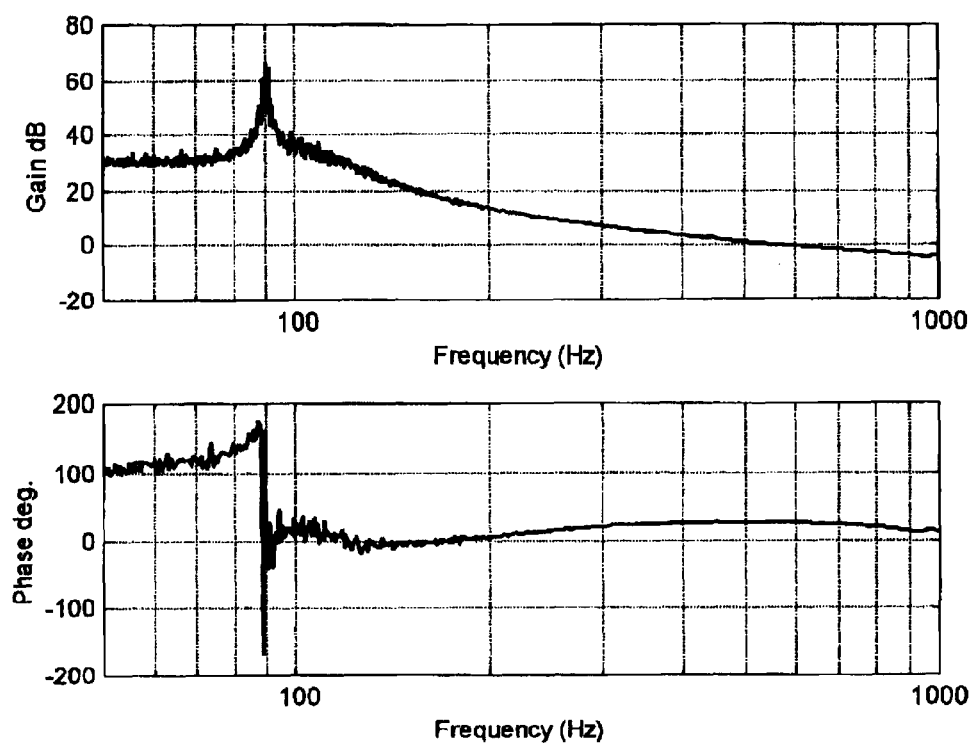
FIG. 3 is a diagram of the characteristics of servo control in FIG. 1.
Figure 4:
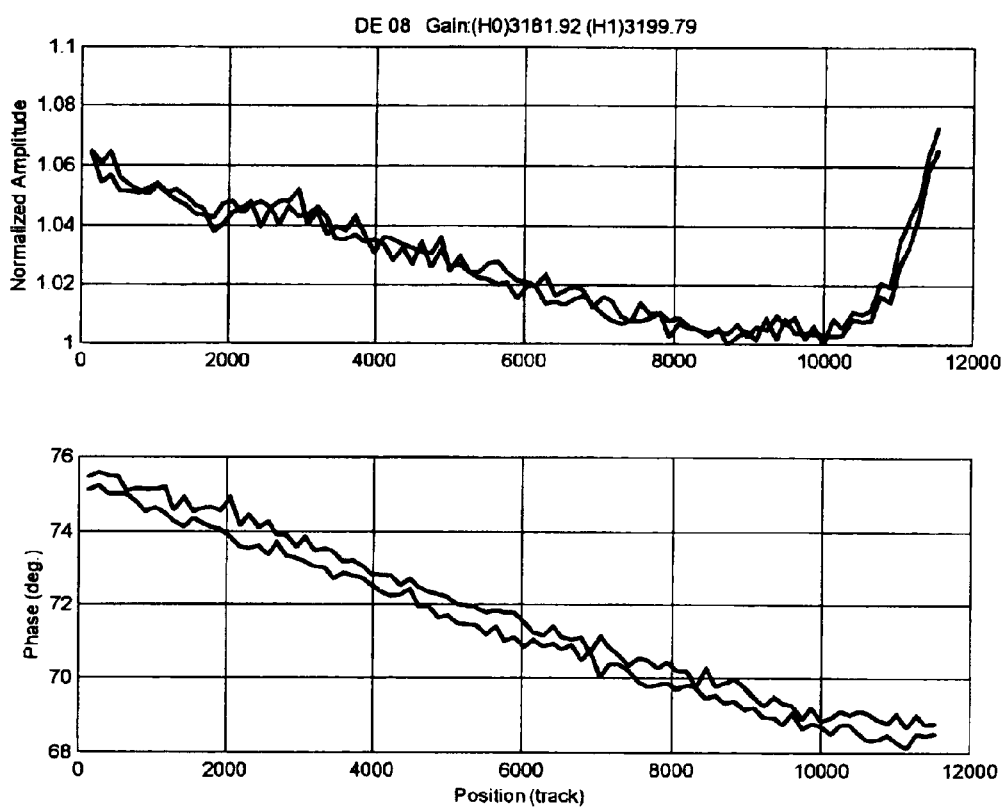
FIG. 4 is a diagram of eccentricity characteristics when using the rotary actuator of FIG. 2.
Figures 5, 6:
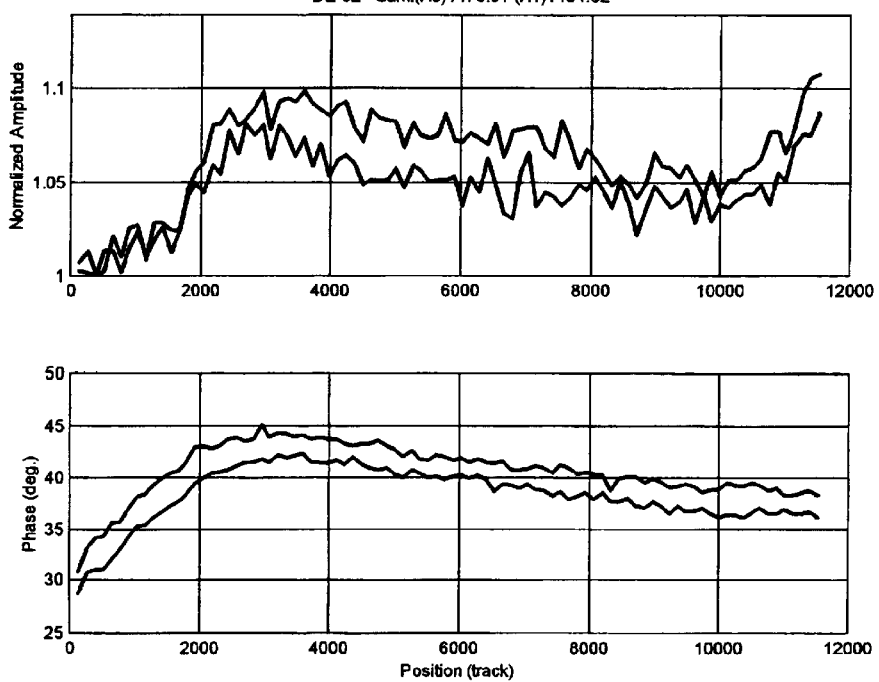
FIG. 5 is a diagram of other eccentricity characteristics when using the rotary actuator of FIG. 2.
FIG. 6 is a drawing of the configuration of the table of FIG. 1.
Figure 7:
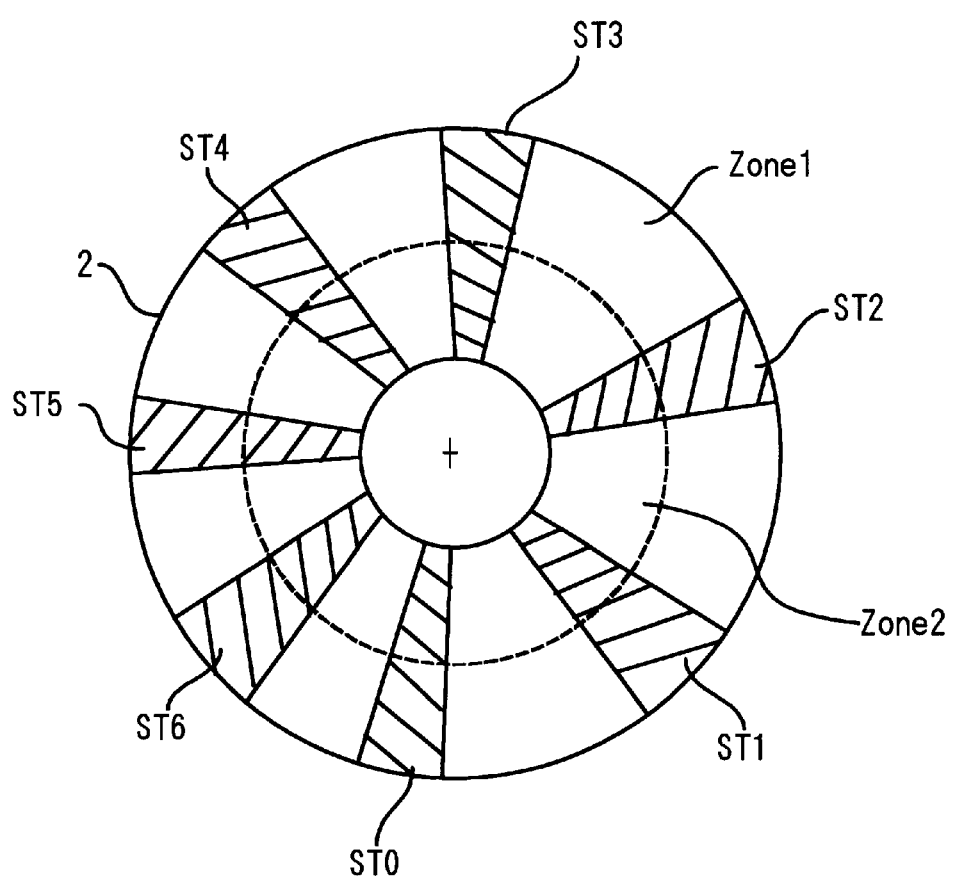
FIG. 7 is a drawing used to explain the table of FIG. 6.

FIG. 1 is a drawing showing the configuration of one aspect of an embodiment of this invention, FIG. 2 is a drawing used to explain the actuator of FIG. 1, FIG. 3 is a diagram used to explain the open-loop characteristics of the controller, FIG. 4 and FIG. 5 are diagrams of eccentricity amplitude and phase characteristics, FIG. 6 is a diagram of the stored table of eccentricity vectors of FIG. 1, and FIG. 7 is a drawing used to explain the vector table of FIG. 1.

FIG. 1 shows a magnetic disk drive, as an example of a disk device. As shown in FIG. 1, the magnetic disk drive 1 has a magnetic disk 2 and magnetic head 3. As shown in FIG. 7, the magnetic disk2 has a plurality of concentric tracks, and each data track is provided with a plurality of sectors, in each of which are embedded servo signals ST0 through ST6. For example, in the case of a $3.5^{inch}$ magnetic disk 2, on one disk side are provided 12,000 tracks, and in one track are provided 1000 sectors.

The magnetic head 3 reads and writes information on the magnetic disk 2. The magnetic head 3 comprises an MR (GMR, TMR) element and a write element. The magnetic disk 2 is rotated by a spindle motor 4. The rotary actuator 5 has a voice coil motor (VCM), and in addition supports the magnetic head 3 and moves the magnetic head 3 in directions to traverse tracks on the magnetic disk 2.

The power amplifier 6 drives the VCM of the actuator 5. The spindle driving circuit 7 drives the spindle motor 4. The control circuit 8 comprises a microprocessor, digital signal processor, analog/digital converter, digital/analog converter, and RAM 11.

The control circuit (hereafter "processor") 8 reads position signals from the magnetic head 3, determines the current position y[k] of the magnetic head, and creates a control value (control current value) u[k] according to the distance (position error) from the target position r. The read/write circuit 9 controls read/write operations of the magnetic head 3 according to instructions from the processor 8. The position detection circuit 10 demodulates servo signals from the magnetic head 3 and outputs position signals to the processor 8.

The hard disk controller 12 controls the interface with the host computer. This hard disk controller 12 is provided with RAM 13. This RAM 13 stores data received from the host computer and data to be sent to the host computer.

FIG. 2 is a diagram of the relationship between the rotary actuator 5 and the magnetic disk 2. Eccentricity occurs due to shift the rotation center O3 of the spindle motor 4 with respect to the center O2 of the disk 2. When using a linear actuator, the head can move linearly toward the rotation center O3 of the motor, and so the eccentricity amplitude and phase of the disk 2 as seen from the head are the same for inner and outer circumferences of the disk 2.

However, as shown in FIG. 2, when a rotary actuator 5 is used, the rotary actuator rotates about the actuator center of rotation O1, so that the trajectory described by the head 3 is an arc shape and not linear. Consequently the effect of a shift of the motor center of rotation from the center of rotation of the disk 2 is different when the head 3 is positioned at an inner circumference of the disk 2, and when the head 3 is positioned at an outer circumference of the disk 2.

FIG. 4 and FIG. 5 show the results of measurements of the amplitude and phase of the primary eccentricity for each track of the disk 2 when an external STW (servo track writer) is used to write servo signals to the disk 2, and the disk 2 is then incorporated into a disk device. In FIGS. 4 and 5, the eccentricity amplitude values are shown as relative values which have been normalized, rather than as absolute values; the phase values are shown as absolute values.

As is clear from the figures, both the amplitude and the phase change with the track position, plotted along the horizontal axis. FIGS. 4 and 5 show measurement results for different disk devices; the extent of the change is different for the two devices. For example, the change in amplitude is at most 6%, but even the smallest eccentricity amplitude is approximately 50 $\mu$m, so the change is at minimum 3 $\mu$m. If the track pitch is approximately 1 $\mu$m, then there exists a change in amplitude which is at minimum equal to three track widths.

On the other hand, as shown in FIG. 3, the open-loop characteristics (gain, phase) of servo control to perform positioning are determined by the sampling frequency. That is, eccentricity following characteristics are determined by the servo control sampling frequency. Hence even if an eccentricity correction signal common to the disk surface is used, it is possible to use servo control to follow the disk eccentricity. However, time is required to achieve following; for example, after the completion of a seek operation, it is necessary to wait five to ten revolutions.

If the sampling frequency is raised, response is improved, and servo control can be employed for rapid following of the above-mentioned changes between tracks, even when using eccentricity correction signals common to the disk surface for each track. However, if the sampling frequency is raised, the number of servo signals per track, shown in FIG. 7, must be increased. This means that the data storage area per track must be reduced, with the undesirable result that the usable storage capacity of the disk is decreased.

In order to correct such changes in eccentricity amplitude and phase between tracks, in the present invention, an eccentricity vector table 11-1 is provided in the RAM 11 as shown in FIG. 1. This table 11-1 stores eccentricity correction vectors for each zone of each head, as shown in FIG. 6.

That is, as shown in FIG. 7, one surface of the disk 2 is divided into a plurality of zones in the radial direction. In FIG. 7, the disk surface is divided into two zones, Zone 1 and Zone 2. Eccentricity correction vectors Z1, Z2 are stored for each zone of each head, that is, of each disk surface, in the table 11-1.

The processor 8 in FIG. 1 reads the eccentricity correction vector for the zone corresponding to the head position, and calculates the eccentricity correction amount. The number of zone divisions can be set freely in accordance with the precision and amount of eccentricity correction required. In this way, one disk surface is divided into a plurality of regions, and eccentricity correction vectors are set for each region, so that the optimum eccentricity correction amount can be calculated according to the head position on the disk.

Hence disk eccentricity can be followed rapidly even if the sampling frequency is not raised, and without any reduction in the disk storage capacity. In particular, when a disk with servo signals written by an external STW is incorporated in a disk device, so that the amount of eccentricity is large and there are large differences in the degree of eccentricity at inner and outer circumferences of the disk, this method is useful and effective in reducing the time required for following control after a seek operation.

An explanation has been given for the case of a hard disk device as the disk device, but the explanation can also be applied to disk devices in which the disk can be exchanged, as well as to optical and magneto-optical disk devices.

[Positioning Control System]

Figure 8:
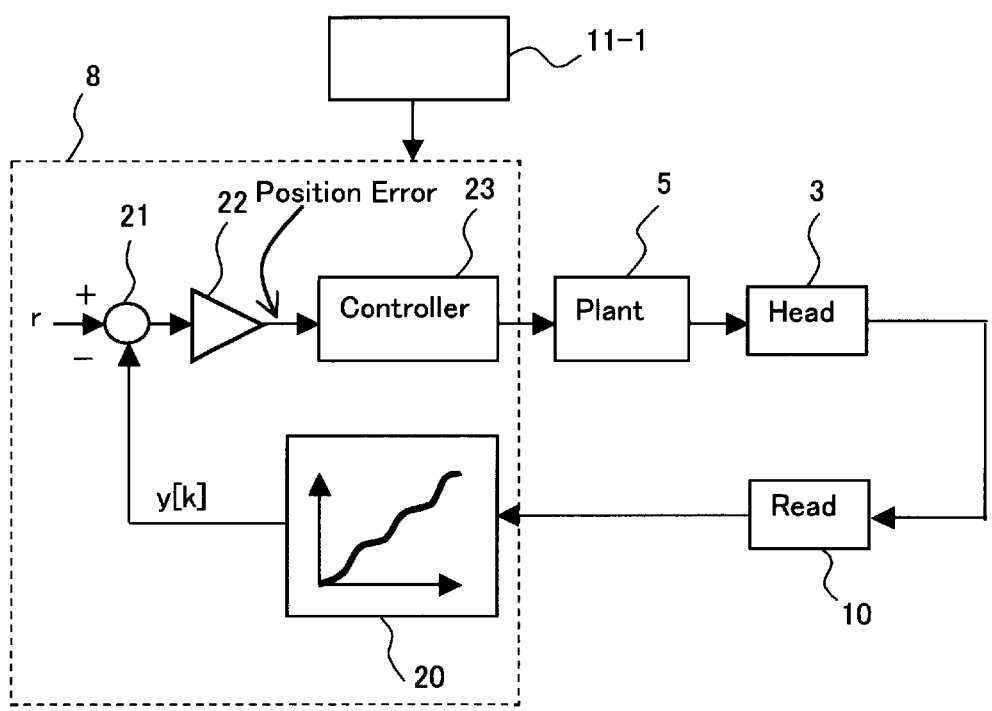
FIG. 8 is a drawing of the configuration of the positioning control unit of FIG. 1.

FIG. 8 is a block diagram of the control system for positioning executed by the processor 8. In FIG. 8, the plant 5 designates the parts which executes physical head positioning in the magnetic disk device, and comprises the rotary actuator 5, amplifier 6, and magnetic disk 2.

Position signals (servo signals) read by the magnetic head 3 from the magnetic disk 2 are demodulated by the position detection circuit 10, and input to the processor 8. In the processor 8, the position demodulation unit 20 demodulates the current position y[k] from the demodulation signal. The error computing unit 21 subtracts the current position y[k] from the target position r to compute the position error. The gain correction unit 22 corrects for the position error. This corrected position error is input to the controller 23. The controller 23 comprises a well-known servo controller. For example, it may comprise a discrete-type current observer, shown in FIG. 9 and described below.

The servo controller 23 reads an eccentricity vector corresponding to the head position from the table 11-1 of the above-mentioned RAM 11, and calculates the amount of eccentricity correction. The eccentricity correction value is added to the servo control value calculated from the position error, and the control value is output to the plant 5.

Figure 9:
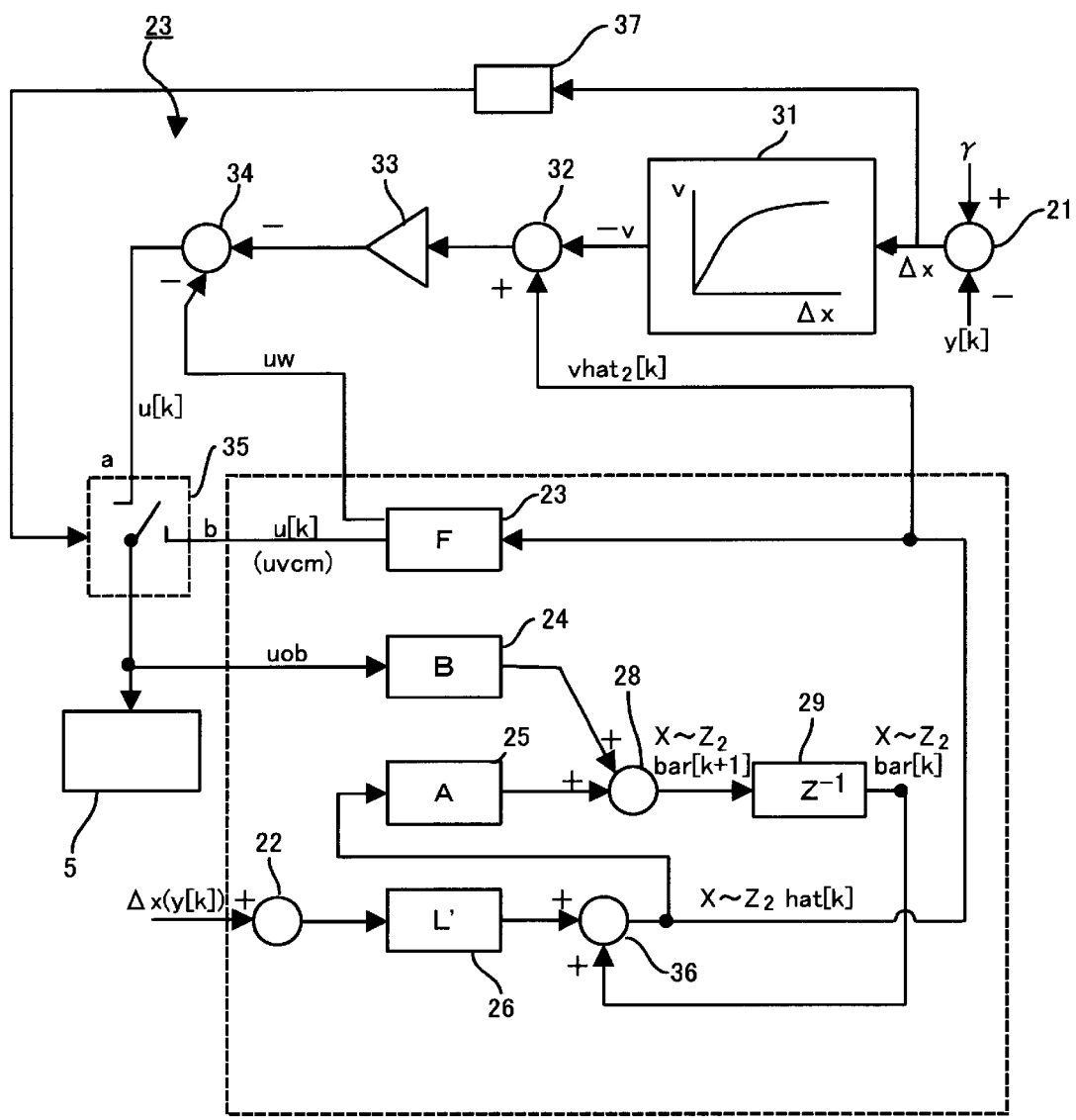
FIG. 9 is a block diagram of the controller of FIG. 8.
Figure 10:
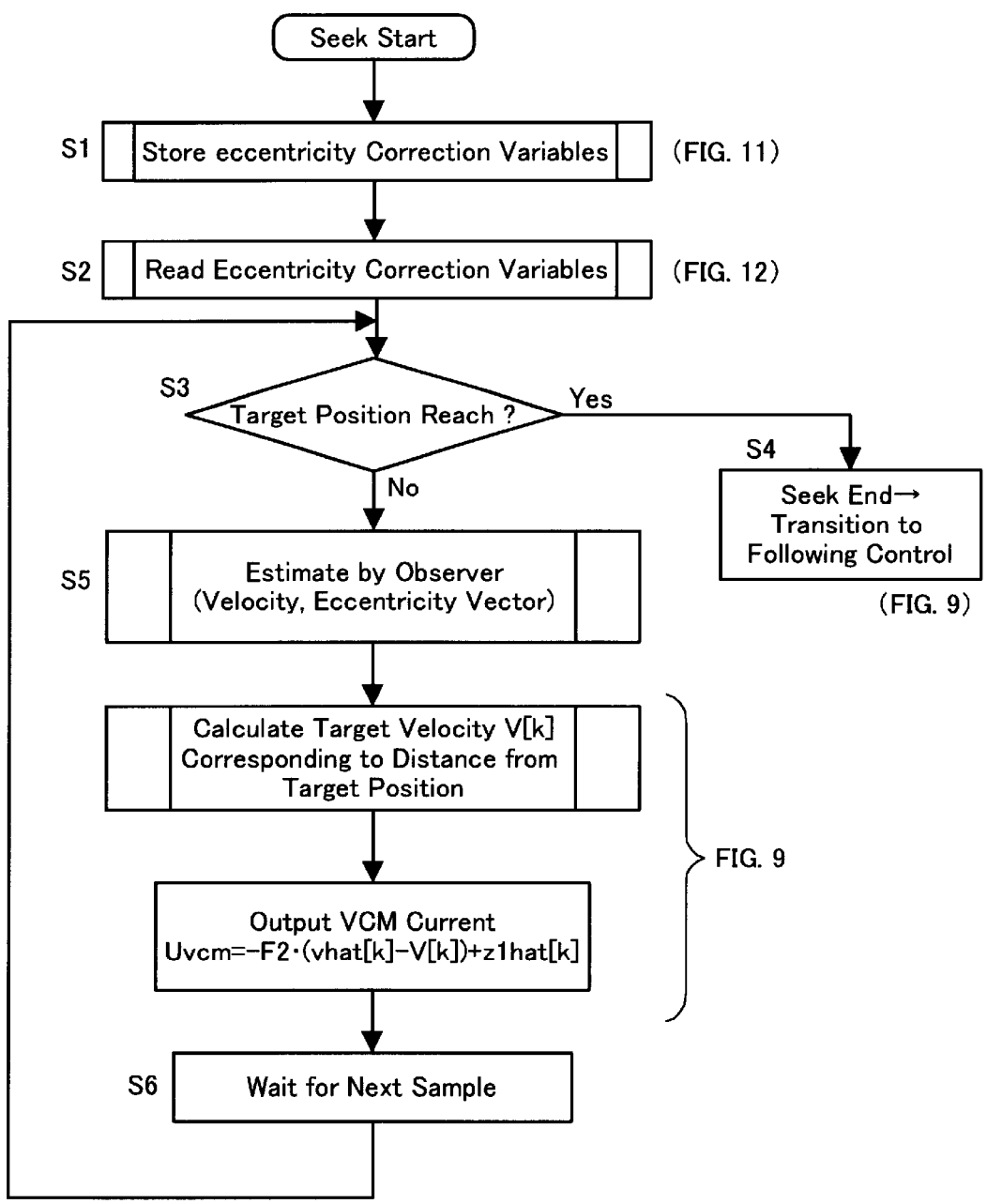
FIG. 10 is a seek processing flow diagram for the control unit of FIG. 8.
Figure 11:
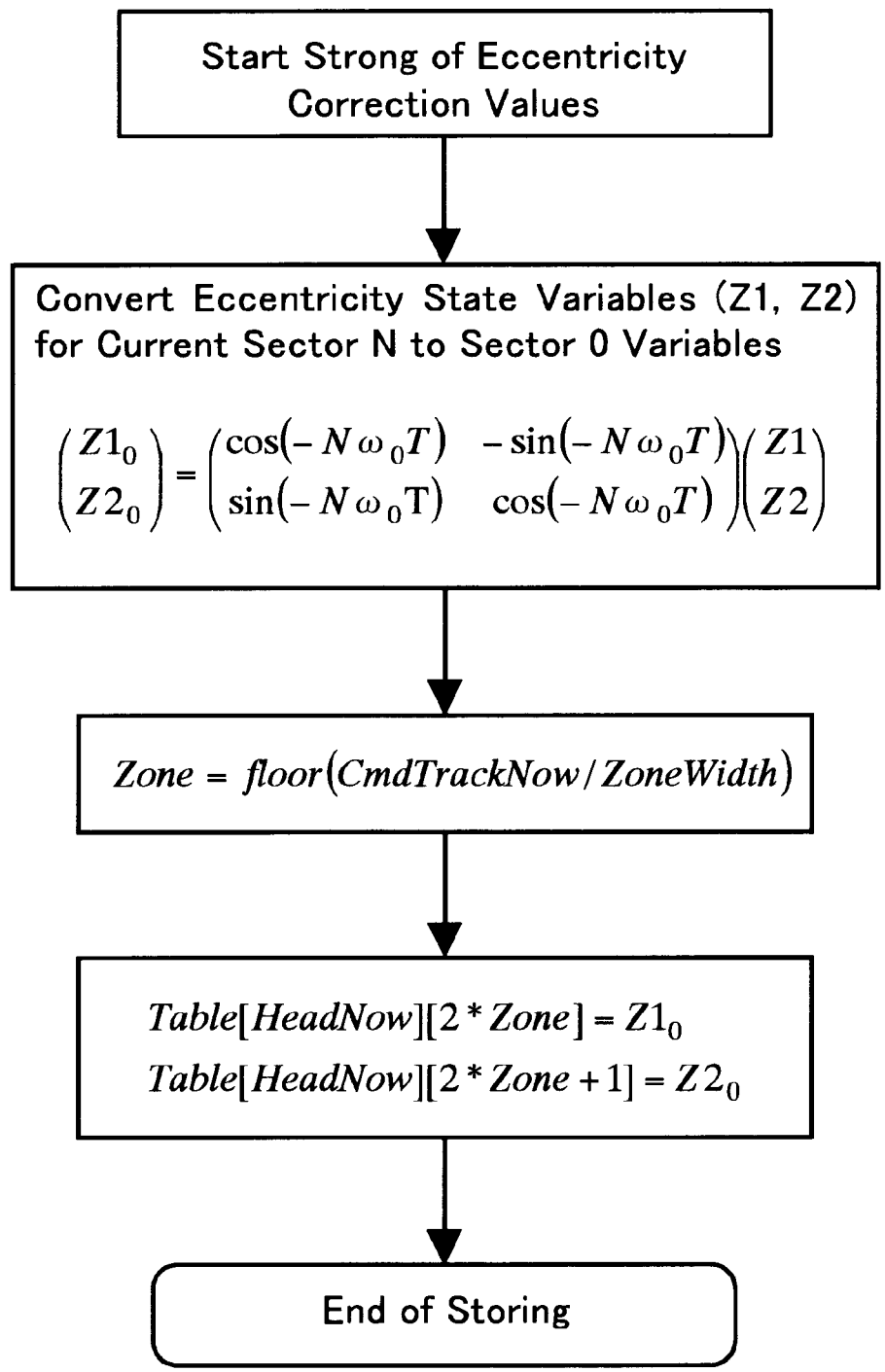
FIG. 11 is a storage processing flow diagram for the control unit of FIG. 10.
Figure 12:
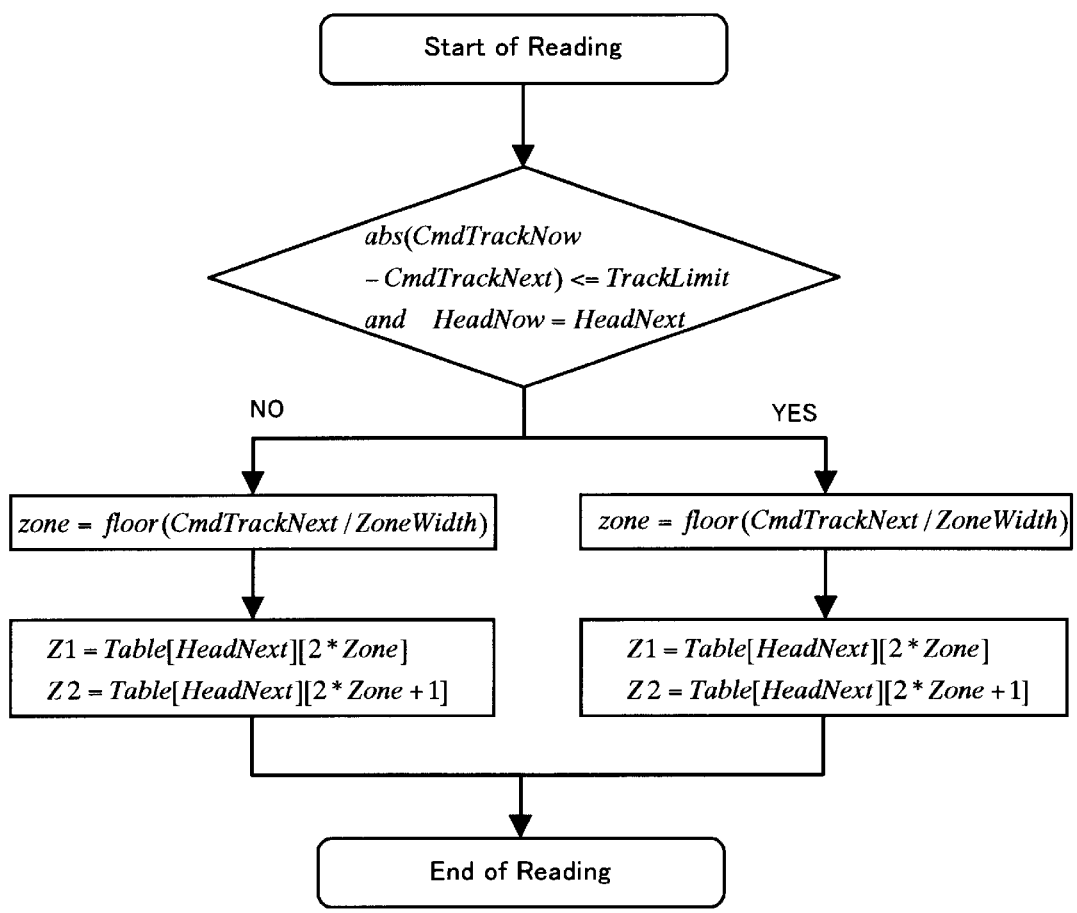
FIG. 12 is a read processing flow diagram for the control unit of FIG. 10.
Figure 13:
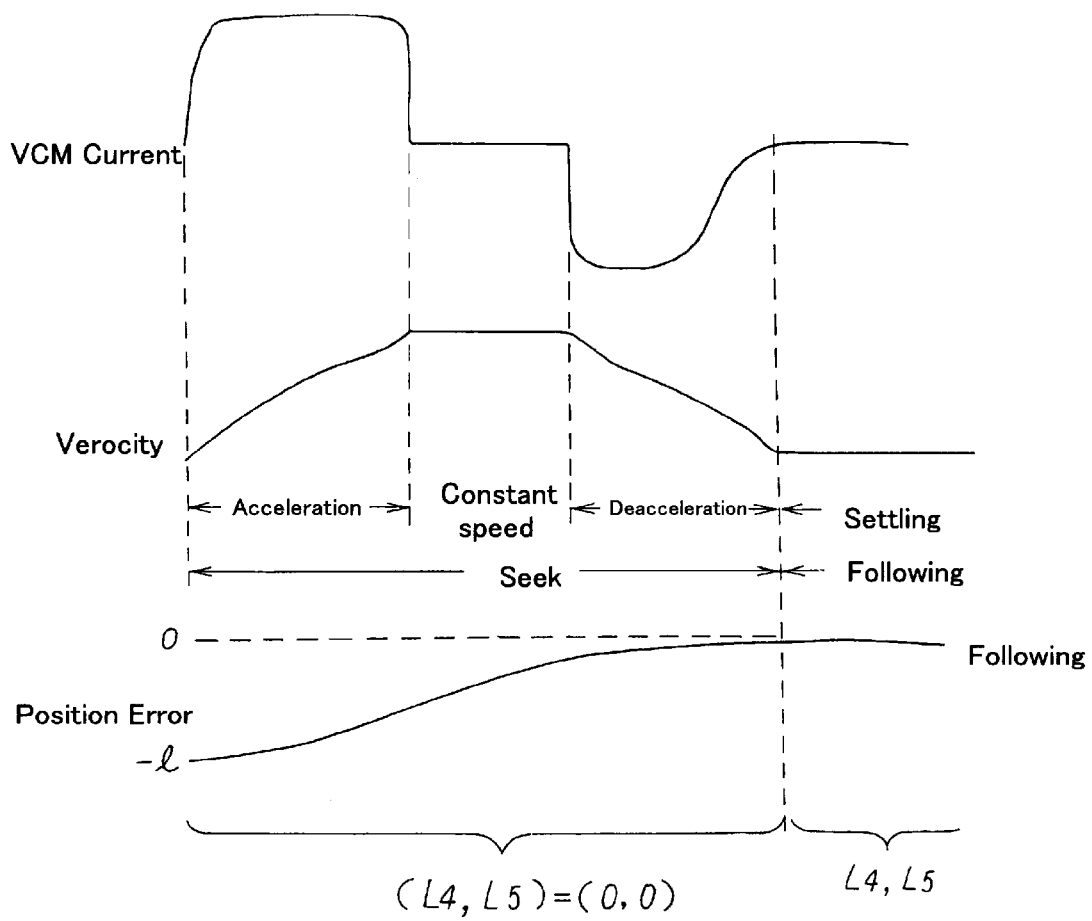
FIG. 13 is a drawing used to explain seek operation in FIG. 10.

Next, the above-mentioned controller 23 is explained. FIG. 9 is a block diagram of the controller, FIG. 10 is a diagram showing the flow of positioning control, FIG. 11 is a diagram of the flow of storage processing in FIG. 10, FIG. 12 is a diagram of the flow of read processing in FIG. 10, and FIG. 13 is a diagram used to explain positioning control operation.

The controller 23 shown in FIG. 9 comprises a discrete-type current observer. As described in the specification of the above-mentioned Japanese Patent Application 10-185046, this observer estimates states by means of the following eqs. (1) through (4).

$$\begin{pmatrix} xhat[k] \\ vhat[k] \\ bhat[k] \\ z1hat[k] \\ z2hat[k] \end{pmatrix} = \begin{pmatrix} xbar[k] \\ vbar[k] \\ bbar[k] \\ z1bar[k] \\ z2bar[k] \end{pmatrix} + \begin{pmatrix} L_1 \\ L_2 \\ L_3 \\ L_4 \\ L_5 \end{pmatrix} (y[k] - xbar[k]) \quad (1)$$

Here xhat[k], vhat[k], bhat[k] are respectively the position state variable (estimated position), velocity state variable (estimated velocity), and bias current state variable (estimated bias) at the current sampling time; z1hat[k], z2hat[k] are eccentricity state variables (estimated eccentricity) at the current sampling time; xbar[k], vbar[k], bbar[k] are respectively the position state variable (estimated position), velocity state variable (estimated velocity), and bias current state variable (estimated bias) at the previous sampling time; and z1bar[k], z2bar[k] are eccentricity state variables (estimated eccentricity) at the previous sampling time.

L1 through L5 are estimation gains of the observer; L1 is the position estimation gain, L2 is the velocity estimation gain, L3 is the bias estimation gain, and L4 and L5 are eccentricity estimation gains. y[k] is the observed position; here, the observed y[k] is the position error.

$$uob = -(F_1 \quad F_2)\begin{pmatrix} xhat[k] \\ vhat[k] \end{pmatrix}, uw = -(1 \quad 1 \quad 0)\begin{pmatrix} bhat[k] \\ z1hat[k] \\ z2hat[k] \end{pmatrix}, \quad (2)$$

$$uvcm = uob + uw \quad (3)$$

Here uob, uw are the actuator control value and eccentricity correction control value, respectively, and F1, F2 is a state feedback matrix. uvcm is the control current value for output.

$$\begin{pmatrix} xbar[k+1] \\ vbar[k+1] \end{pmatrix} = \begin{pmatrix} 1 & T \\ 0 & 1 \end{pmatrix} \begin{pmatrix} xhat[k] \\ vhat[k] \end{pmatrix} + K_a \begin{pmatrix} T^2 \\ T^2 \end{pmatrix} uob[k], \quad (4)$$

$$\begin{pmatrix} bbar[k+1] \\ z1bar[k+1] \\ z2bar[k+1] \end{pmatrix} = \begin{pmatrix} 1 & 0 & 0 \\ 0 & \cos(\omega_0 T) & -\sin(\omega_0 T) \\ 0 & \sin(\omega_0 T) & \cos(\omega_0 T) \end{pmatrix} \begin{pmatrix} bhat[k] \\ z1hat[k] \\ z2hat[k] \end{pmatrix}.$$

Figure 14:
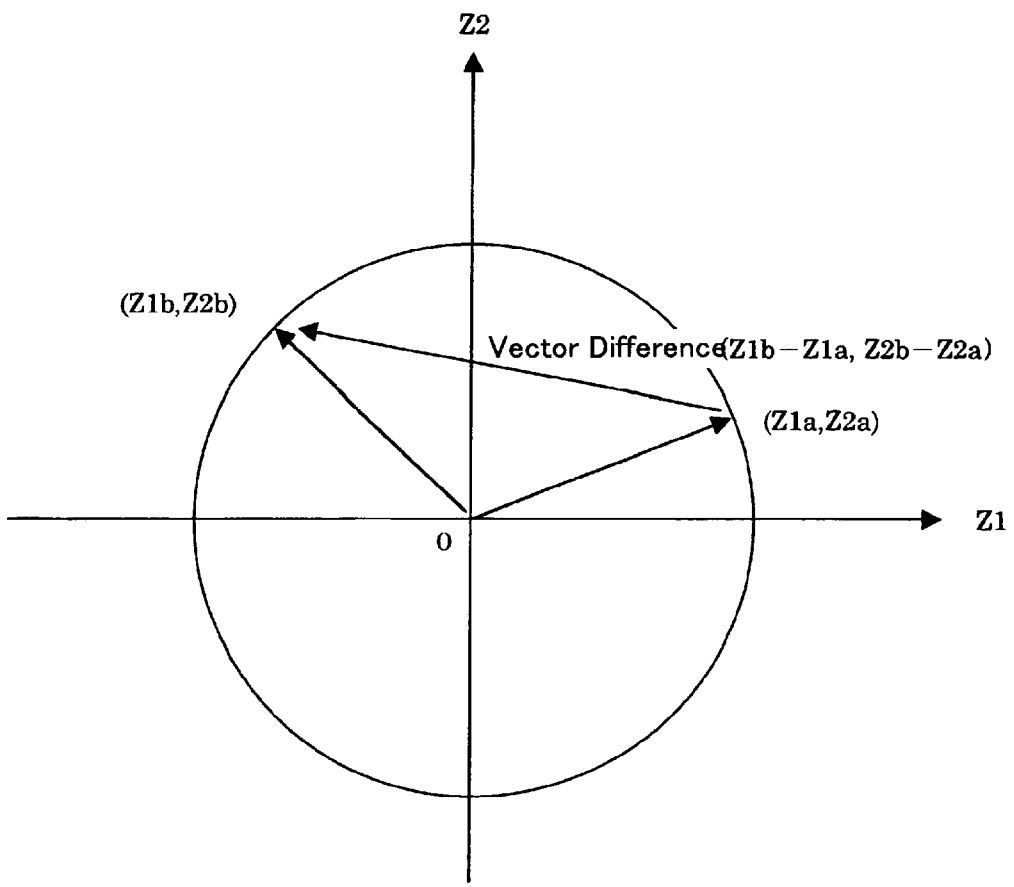
FIG. 14 is a diagram used to explain another aspect of an embodiment of this invention.

Here xbar [k+1], vbar [k+1], bbar [k+1] are respectively the position state variable (estimated position), velocity state variable (estimated velocity), and bias current state variable (estimated bias) at the current sampling time; z1bar[k+1], z2bar[k+1] are eccentricity state variables (estimated eccentricity) at the current sampling time. T is the sampling period. As shown in FIG. 14, in the orthogonal coordinate system (z1,z2), the eccentricity indicates the motion of a point revolving with fixed velocity (angular velocity ω0) on a circle of fixed radius.

FIG. 9 is a block diagram showing this with a velocity control system added. When a servo interrupt (servo gate signal) is applied to the processor 8, the processor 8 calculates the current position y[k] from the demodulation signal of the position detection circuit 10. The error computing unit 21 calculates abs[y−r], the absolute value of the difference between the target position r and the current position (position signal) y[k].

The mode discriminator 37 determines whether the absolute value abs[y−r] is equal to four tracks or less. Here, four tracks is adopted as the criterion to distinguish between seeking and following. Hence if the absolute value abs[y−r] is four tracks or less, the operation is judged to be following, and the switch 35 is connected to the 'b' side. If the absolute value abs[y−r] exceeds four tracks, the operation is judged to be seeking, and the switch 35 is connected to the 'a' side.

Within the observer 36, the position error Δx (in the above-mentioned equations, defined in terms of the observed position y[k]) is input to the fourth gain multiplier 26. The gain multiplier 26 multiplies the error by the estimated gain L (L1 through L5) (cf. eq. (1)).

The second gain multiplier 24 multiplies the control current uob[k] by the coefficient Ka (cf. eq. (4)). The third gain multiplier 25 multiplies the state signal xhat[k]−z2hat [k] at the current sampling time by the coefficient of eq. (4). The adder 28 adds the outputs of the two adders 24 and 25. By this means, the state signal xbar[k+1]−z2bar[k+1] for the subsequent sampling time of eq. (4) is output.

The state signal xbar[k+1]−z2bar[k+1] at the subsequent sampling time is delayed one sampling interval by the delay circuit 29, and the state signal xbar[k]−z2bar[k] at the current sampling time is obtained. This state signal is added to the output of the gain multiplier 26 by the adder 36, to obtain the state signal xhat[k]−z2hat[k] at the time of the current sampling of eq. (1). This state signal is multiplied by the feedback coefficient F by the first multiplier 23. By this means, the control current u[k] at the current time, as indicated in eqs. (2) and (3), is obtained. This control current u[k] is supplied to the plant 20. The estimated value of the eccentricity uw is supplied to the velocity control system.

During seek operations, the target velocity generator 31 creates the target velocity v0 from the position error Δx. The velocity difference computation unit 32 calculates the difference in velocity between the target velocity V0 and the observer 36 estimated velocity vhat[k]. The gain multiplier 33 multiplies the velocity difference by the velocity gain C0. The compensator 34 adds the velocity difference and the eccentricity estimate value uw of the observer 36, and reverses the result for output as the control current u[k].

If the operation is judged to be following, the processor 8 substitutes settings for the eccentricity estimation gain L4, L5 of the block 26 of the observer 36. The eccentricity estimation gain L4, L5 is designed so as to converge to zero when the position error is zero. And, the processor 8 performs state calculations for the above-mentioned observer, and outputs the control current u[k] to the plant (amplifier 6). This servo interrupt is then concluded.

In this way, the observer 36 comprises an eccentricity estimation observer comprising an actuator model and an eccentricity model, which predicts the next state from the error between the detected position and the estimated position, control current and state variables, and creates a control current from this state. Hence eccentricity correction is performed in realtime, so that prompt compensation for eccentricity is possible.

Next, the seek process which sets eccentricity correction values for each of the above-mentioned regions of the disk is explained. FIG. 10 is a diagram of the flow of seek processing for one aspect of an embodiment of this invention; FIG. 11 is a diagram of the flow of processing to store the eccentricity correction variables; FIG. 12 is a diagram of the flow of processing to read the eccentricity correction variables; and FIG. 13 is a diagram used to explain seek processing operation.

(S1) When seeking is started, first the eccentricity correction variables are stored. That is, the eccentricity correction variables at the position of the current sector are stored. As explained above, the eccentricity correction variables are calculated in realtime by the controller 23, and because this changes depending on the state, the current state is stored. That is, as shown in FIG. 11, the eccentricity correction variables (Z1,Z2) for the current sector N are converted into eccentricity correction variables (Z10,Z20) for a sector 0 chosen as a reference sector, using eq. (5) below. In the observer 36, the eccentricity correction variables (Z1,Z2) for sector N are Z1hat[k], Z2hat[k].

$$\begin{pmatrix} Z1_0 \\ Z2_0 \end{pmatrix} = \begin{pmatrix} \cos(-N\omega_0 T) & -\sin(-N\omega_0 T) \\ \sin(-N\omega_0 T) & \cos(-N\omega_0 T) \end{pmatrix} \begin{pmatrix} Z1 \\ Z2 \end{pmatrix} \quad (5)$$

Next, the zone Zone to which the current position belongs is calculated from the current track position CmdTrackNow and the zone width ZoneWidth, using eq. (6) below.

$$ZONE = floor(CmdTrackNow/ZoneWidth) \quad (6)$$

Here floor denotes the integer part in a C language program. Next, the eccentricity correction variables (Z10, Z20) are stored in the table 11-1 of FIG. 6. Because the disk surface is divided into two zones in the case of FIG. 6, the stored address is determined by the current head HeadNow and double the zone2Zone. In this way, storage processing is concluded.

(S2) Next, the eccentricity correction variables (Z1,Z2) for the track position which is the target of the seek operation, CmdTrackNext, is read from the table 11-1. As shown in FIG. 12, the absolute value abs(CmdTrackNow−CmdTrackNext) is calculated, and a judgment is made as to whether the result is smaller than the scheduled track difference limit TrackLimit. That is, a judgment is made as to whether the difference between the current position and the target position is small or not. Also, a judgment is made as to whether the seek head HeadNext and the current head HeadNow are equal. In cases where the difference between the current position and target position is small, and moreover there is no head switching, the seek distance is on the same disk surface and over a small distance, and so it is decided that the eccentricity correction variables are unchanged from the current variables. The zone is calculated using the above-mentioned eq. (6), the seek head HeadNext and the 2*Zone address eccentricity correction variables Z1,Z2 are read from the table 11-1, and these are set as the initial values of Z1hat[k], Z2hat[k] of the above-mentioned observer 36.

If however the difference between the current position and the target position is large, or if there is head switching, the eccentricity correction variables are judged to be different from the current eccentricity correction variables, and the zone is calculated using eq. (7) below.

$$ZONE = floor(CmdTrackNext/ZoneWidth) \quad (7)$$

The eccentricity correction variables Z1,Z2 are then read from the table 11-1 for the seek head HeadNext and the 2*Zone address, and are set as the initial values Z1hat[k], Z2hat[k] of the above-mentioned observer 36. In this way, read processing is concluded.

(S3) After initial values are set, as explained above, a judgment as to whether the target position has been reached is made from the position error. In the above example, when the position error has become four tracks, the target position is judged to have been reached. If the target position has not been reached, execution advances to step S5.

(S4) If the target position has been reached, as explained above, execution shifts to following control by the observer 36.

(S5) Seek control calculations are executed. Under the above-mentioned observer control, the velocity is estimated and the eccentricity vector value is calculated for the current sample as shown in FIG. 9, the target velocity v is calculated, and the VCM current Uvcm is calculated as in FIG. 9 and is output to the plant 5. That is, the VCM current Uvcm is calculated using the following equation.

$$Uvcm = -F2 \cdot (vhat[k] - v[k]) + z1hat[k] \quad (8)$$

(S6) The next sample is awaited, and execution returns to step S3.

This processing flow is shown in FIG. 13. In this example, at the time seeking is begun the eccentricity correction vector is modified to the eccentricity correction vector of the target position. Consequently when seeking is concluded and following is begun, there is no mistracking due to eccentricity. Hence a transition can be made to following control at an accurate position. Consequently the time required for following can be shortened.

At the time seeking is begun, the eccentricity correction vector is modified, so that there is no need to perform processing to modify the eccentricity seek vector during seek calculations. Hence there is no degradation of the performance of seek calculation processing, which must be performed rapidly. Consequently high-speed seek operations are possible.

Of course during seeking, processing to modify the eccentricity correction vector may be performed according to the current position. In this case, seek velocity control becomes more accurate. Also, when following control is begun, the eccentricity correction vector may be modified. The above explanation has been for the case of eccentricity correction by observer control; but another servo control system which estimates rotation vectors may be used. For example, a system which uses DFT (Digital Fourier Transfer) to extract the rotational frequency component of the position error and correct for eccentricity also estimates the rotation vector, and can also be applied.

[Other Aspects of the Embodiment]

FIG. 14 is a diagram used to explain another aspect of an embodiment of this invention. In FIG. 14, the eccentricity correction values of sector 0 of zone 1 of the disk surface are Z1a, Z2a, and the eccentricity correction values of sector 0 of zone 2 are Z1b, Z2b. The eccentricity correction values of the current sector N are Z1c, Z2c. When seeking from zone 1 to zone 2, the eccentricity correction values Z1b[k], Z2b[k] of sector 0 of zone 2 can be corrected to the current eccentricity state by using eqs. (9) below.

$$Z1b[k] = Z1c + (Z1b - Z1a)$$

$$Z2b[k] = Z2c + (Z2b - Z2a) \quad (9)$$

In other words, the values of Z1a, Z2a, Z1b, Z2b measured in advance are stored in ROM, and eccentricity correction values for the current sector 0 of the seek destination can be calculated from the vector difference. Hence it is sufficient to provide in ROM the table 11-1 of FIG. 1.

Similarly, initial values of the above-mentioned table 11-1 are measured in advance and stored prior to shipment. By this means, immediate eccentricity correction is possible.

In the above examples, an explanation has been given for correction for first-order eccentricity, which is the component of the disk revolution frequency. Correction for higher-order eccentricity components, such as components at double or triple the disk revolution frequency, is also possible. In this case, accurate correction for higher-order eccentricity is possible by performing measurements using well-known repetitive control to generate higher-order eccentricity correction currents. In order to conserve memory, higher-order eccentricity correction currents can be used in common for a disk surface.

Figure 15:
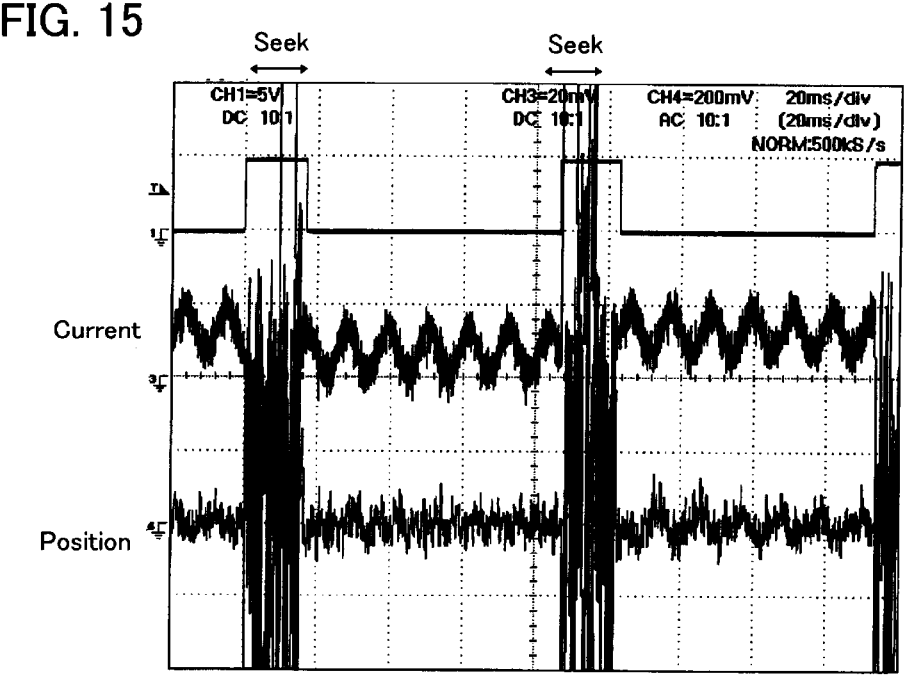
FIG. 15 is a diagram used to explain an embodiment of this invention.
Figure 16:
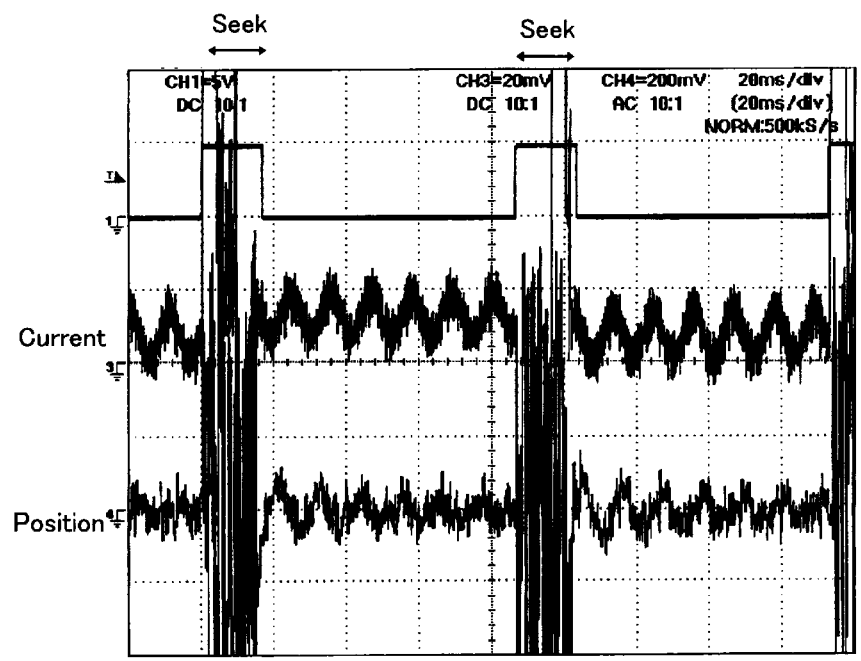
FIG. 16 is a diagram used to explain a comparative example of this invention.

FIG. 15 is a diagram showing the seek timing, current and position when, by means of this invention, a plurality of eccentricity correction vectors are set for a disk surface, and eccentricity correction vectors are modified according to the target position. FIG. 16 is a diagram showing, as a comparative example, the seek timing, current and position in conventional eccentricity correction using eccentricity vectors common to a disk surface.

In the comparative example of FIG. 16, the eccentricity correction amount at the target position is not appropriate, so that fluctuations due to eccentricity remain after the completion of seeking. In the case shown in FIG. 15 applying the present invention, there are few fluctuations (positional changes) after seek completion, and eccentricity is corrected effectively.

When using a rotary actuator, there is a large difference in the amount of eccentricity at inner and outer circumferences of the disk. By dividing the disk into a plurality of regions, and setting eccentricity correction information for each region, optimal eccentricity correction can be performed in accordance with the head position.

Further, optimal eccentricity correction can be performed at each track without increasing the sampling frequency. By this means, a sector servo system can be used for eccentricity correction without decreasing the data storage capacity.

What is claimed is:

1. A head position control method for a disk device, of controlling a position of a head on tracks of a rotating disk, comprising:
    a step of reading position information for a sector of said disk with the head;
    a step of detecting a current position of said head by demodulating said position information; and
    a step of calculating an actuator control amount for driving the rotary actuator which moves said head, from a control amount corresponding to a position error between a target position and said current position and an eccentricity correction amount for said disk,
    wherein said calculating step has a step of reading out eccentricity correction information corresponding to the position of said head from the eccentricity correction information stored for each of a plurality of regions, divided in the radial direction on said disk, and a step of calculating said eccentricity correction amount from said read out eccentric correction information,
    said calculating step comprising:
        a storage step for storing eccentricity correction information for the current position at start of seek operation;
        a step for reading eccentricity correction information for the region of the target position of said seek operation; and
        a step for calculation of said eccentricity correction amount according to said read-out eccentricity correction information.

2. The head position control method for a disk device according to claim 1, said storage step further comprising:
    a step of converting the eccentricity correction amount for said current position into eccentricity correction information for the reference sector of the track of said current position; and
    a step of storing said converted eccentricity correction information,
    wherein said reading step comprises a step of converting said read-out eccentricity correction information into eccentricity correction information for the sector of said target position.

3. The head position control method for a disk device according to claim 1, wherein said calculation step comprises a step of performing by an observer which estimates the position, velocity and eccentricity correction amount of said head.

4. The head position control method for a disk device according to claim 1, wherein said reading step comprises a step of reading said position information for a sector of a magnetic disk with a magnetic head.

5. A head position control device for a disk device, comprising:
    a head for at least reading information on a disk storage media;
    a rotary actuator for moving said head with respect to said disk storage media;
    a control circuit for calculating an actuator control amount to drive said rotary actuator, based on position signals read from said disk storage media by said head; and
    a memory for storing eccentricity correction information for each of a plurality of regions divided in the radial direction of said disk storage,
    wherein said control circuit reads the eccentricity correction information corresponding to the position of said head from said memory, and calculates the eccentricity correction amount, and
    wherein said control circuit stores eccentricity correction information for the current position at start of seek operation, read out from said memory said eccentricity correction information for the region of the target position of said seek operation, and calculates said eccentricity correction amount according to said read-out eccentricity correction information.

6. The head position control device of claim 5, wherein said control circuit calculates said actuator control amount from a control amount corresponding to a position error between a target position and said current position and said eccentricity correction amount.

7. The head position control device of claim 5, wherein said control circuit converts the eccentricity correction amount for said current position into eccentricity correction information for the reference sector of the track of said current position and stores said converted eccentricity correction information, and converts said read-out eccentricity correction information into eccentricity correction information for the sector of said target position.

8. The head position control device of claim 5, wherein said control circuit comprises an observer which estimates the position, velocity and eccentricity correction amount of said head.

9. The head position control device of claim 5, wherein said head comprises a magnetic head for reading said position information for a sector of a magnetic disk.

10. A disk device comprising:
    a head for at least reading information on a disk storage media;
    a rotary actuator for moving said head with respect to said disk storage media;
    a spindle for rotating said disk storage media;
    a control circuit for calculating an actuator control amount to drive said rotary actuator, based on position signals read from said disk storage media by said head; and
    a memory for storing eccentricity correction information for each of a plurality of regions divided in the radial direction of said disk storage, wherein said control circuit reads the eccentricity correction information corresponding to the position of said head from said memory, and calculates the eccentricity correction amount, wherein said control circuit stores eccentricity correction information for the current position at start of seek operation, reads out from said memory said eccentricity correction information for the region of the target position of said seek operation, and calculates said eccentricity correction amount according to said read-out eccentricity correction information.

11. The disk device of claim 10 wherein said control circuit calculates said actuator control amount from a control amount corresponding to a position error between a target position and said current position and said eccentricity amount.

12. The disk device of claim 10, wherein said control circuit converts the eccentricity correction amount for said current position into eccentricity correction information for the reference sector of the track of said current position and stores said converted eccentricity correction information, and converts said read-out eccentricity correction information into eccentricity correction information for the sector of said target position.

13. The disk device of claim 10, wherein said control circuit comprises an observer which estimates the position, velocity and eccentricity correction amount of said head.

14. The disk device of claim 10, wherein said head comprises a magnetic head for reading said position information for a sector of a magnetic disk.

* * * * *